(12) United States Patent
Liu et al.

(10) Patent No.: US 11,584,604 B2
(45) Date of Patent: Feb. 21, 2023

(54) CURLING DEVICE AND FLEXIBLE SCREEN CURLING APPARATUS

(71) Applicant: BOE Technology Group Co., Ltd., Beijing (CN)

(72) Inventors: Shuqi Liu, Beijing (CN); Junwei Yan, Beijing (CN); Haoran Gao, Beijing (CN); Li Li, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 825 days.

(21) Appl. No.: 16/514,395

(22) Filed: Jul. 17, 2019

(65) Prior Publication Data

US 2020/0148495 A1 May 14, 2020

(30) Foreign Application Priority Data

Nov. 13, 2018 (CN) .......................... 201811345778.0

(51) Int. Cl.
| | |
|---|---|
| *G01N 3/20* | (2006.01) |
| *G09F 9/30* | (2006.01) |
| *G01M 11/08* | (2006.01) |
| *B65H 29/70* | (2006.01) |
| *B65H 23/04* | (2006.01) |

(52) U.S. Cl.
CPC ........... *B65H 29/70* (2013.01); *B65H 23/048* (2013.01); *G01N 3/20* (2013.01); *B65H 2301/5121* (2013.01); *B65H 2402/30* (2013.01)

(58) Field of Classification Search
CPC combination set(s) only.
See application file for complete search history.

(56) References Cited

U.S. PATENT DOCUMENTS

| | | | |
|---|---|---|---|
| 10,557,781 B2 | 2/2020 | Han et al. | |
| 10,599,185 B2 | 3/2020 | Yu et al. | |
| 11,270,606 B2* | 3/2022 | Kwon | ................. H05K 5/0017 |
| 2013/0016497 A1 | 1/2013 | Anderson | |
| 2016/0363960 A1* | 12/2016 | Park | ....................... G09F 9/301 |

(Continued)

FOREIGN PATENT DOCUMENTS

| | | |
|---|---|---|
| CN | 204330366 U | 5/2015 |
| CN | 106504649 A | 3/2017 |
| CN | 106841895 A | 6/2017 |

(Continued)

OTHER PUBLICATIONS

Mar. 19, 2020 (CN) Office Action application 201811345778.0 with English Translation.

*Primary Examiner* — Brandi N Hopkins
(74) *Attorney, Agent, or Firm* — Banner & Witcoff, Ltd.

(57) ABSTRACT

A curling device for curling a flexible sheet is provided. The curling device includes: a curling component configured to fix a first end of the flexible sheet; a movable part configured to fix a second end of the flexible sheet, the second end being opposite to the first end; and a transmission mechanism coupled to the curling component and the movable part, respectively; the transmission mechanism is configured to move the movable part relative to the curling component in a first direction, in response to receiving an external driving force, so as to drive the curling component to rotate, the first direction is perpendicular to an axis direction of the curling component.

20 Claims, 4 Drawing Sheets

(56) References Cited

U.S. PATENT DOCUMENTS

2017/0344073 A1* 11/2017 Kang .................. G06F 1/1652

FOREIGN PATENT DOCUMENTS

| CN | 206573647 U | 10/2017 |
| CN | 107452282 A | 12/2017 |
| CN | 107631861 A | 1/2018 |
| CN | 107665657 A | 2/2018 |
| CN | 207263446 U | 4/2018 |
| CN | 107993573 A | 5/2018 |

* cited by examiner

CURLING DEVICE AND FLEXIBLE SCREEN CURLING APPARATUS

CROSS-REFERENCE TO RELATED APPLICATION

The present application claims priority of Chinese Patent Application No. 201811345778.0 filed on Nov. 13, 2018, the disclosure of which is incorporated herein by reference in its entirety as part of the present application.

TECHNICAL FIELD

Embodiments of the present disclosure relate to a curling device and a flexible screen curling apparatus including the curling device.

BACKGROUND

In industrial production or daily life, it is usually necessary to curl or bend some objects. For example, in the field of displays, a flexible display device that can be bent or curled is one of development directions of a next-generation display technology. A curling life (service life) and a curling reliability are important performances to measure a quality of such a flexible display device. In design and production processes of a flexible display product that can be curled, it is necessary to test a curling life and a curling reliability of relevant components of the flexible display device. Of course, such test on curling life and reliability is also necessary for other products required to be in a curved or bent state, for example, a scroll that needs to be repeatedly unrolled and curled in a using process and a carrying process, respectively. Moreover, in some occasions, a final product is also expected to present a curved or bent state.

SUMMARY

Embodiments of the present disclosure provide a curling device for curling a flexible sheet, which includes: a curling component configured to fix a first end of the flexible sheet; a movable part configured to fix a second end of the flexible sheet, the second end being opposite to the first end; and a transmission mechanism coupled to the curling component and the movable part, respectively; the transmission mechanism is configured to move the movable part relative to the curling component in a first direction, in response to receiving an external driving force, so as to drive the curling component to rotate, the first direction is perpendicular to an axis direction of the curling component.

In some embodiments of the present disclosure, the curling component includes a roller.

In some embodiments of the present disclosure, the transmission mechanism includes a first wheel, a second wheel, a third wheel and a fourth wheel; the first wheel and the second wheel are coupled to each other through a first conveyor belt; the third wheel and the fourth wheel are coupled to each other through a second conveyor belt; the second wheel is coaxially coupled to the third wheel; the fourth wheel is coaxially coupled to the roller; one of the first wheel and the first conveyor belt is configured to receive the external driving force; and the movable part is coupled to the first conveyor belt.

In some embodiments of the present disclosure, the first conveyor belt is coupled to a link rod; and the link rod is arranged to be parallel with the first direction, and is configured to move along the first direction under an action of the external driving force.

In some embodiments of the present disclosure, the second wheel and the third wheel are coupled to each other through a first shaft, the roller and the fourth wheel are coupled to each other through a second shaft, the first shaft and the second shaft are parallel with each other, the first shaft is located below the second shaft, and a line connecting centers of the first wheel and the second wheel is parallel with the first direction.

In some embodiments of the present disclosure, the transmission mechanism further includes a fifth wheel located between the third wheel and the fourth wheel, the fifth wheel is in contact with the second conveyor belt through which the third wheel and the fourth wheel are coupled to each other, and the fifth wheel is located within a region defined by the second conveyor belt.

In some embodiments of the present disclosure, a line connecting centers of the third wheel, the fourth wheel and the fifth wheel forms a triangle.

In some embodiments of the present disclosure, the triangle is an obtuse triangle.

In some embodiments of the present disclosure, an included angle between a line connecting the centers of the fifth wheel and the third wheel and a line connecting the centers of the fifth wheel and the fourth wheel is an obtuse angle.

In some embodiments of the present disclosure, at least one selected from the group consisting of the first wheel, the second wheel, the third wheel, the fourth wheel and the fifth wheel includes a gear wheel or a pulley wheel.

In some embodiments of the present disclosure, a radius of the fourth wheel is equal to a radius of the roller, and a radius of the second wheel is equal to a radius of the third wheel.

In some embodiments of the present disclosure, the curling device further includes a support frame, wherein the roller is coupled to a first side edge of a top surface of the support frame, the support frame includes a guide rail bridged between the first side edge of the top surface and a second side edge of the top surface opposite to the first side edge, and the movable part is configured to move in the first direction along the guide rail.

In some embodiments of the present disclosure, the movable part is provided with a clamping part configured to fix the second end of the flexible sheet; the movable part further includes an elastic element, the elastic element has a first end coupled to the clamping part and a second end coupled to a main body of the movable part, and the second end of the elastic element is further away from the first side edge of the support frame than the first end of the elastic element.

In some embodiments of the present disclosure, the main body of the movable part includes a beam supported by the guide rail and located above the guide rail, the beam is arranged to be parallel with the first side edge of the support frame, the clamping part is coupled to the beam, and the second end of the elastic element is coupled to a rear wall of the beam that is away from the first side edge of the support frame.

In some embodiments of the present disclosure, the curling device further includes a first housing configured to encapsulate a third wheel, a fourth wheel and a second conveyor belt, wherein the first housing is coupled to a first side surface of the support frame that is perpendicular to the top surface, and the first side surface includes the first side edge.

In some embodiments of the present disclosure, the curling device further includes a second housing configured to encapsulate a first wheel, a second wheel and a first conveyor belt, wherein the second housing has one end coupled to a second side surface of the support frame and the other end coupled to the first side surface, the second side surface is opposite to the first side surface.

In some embodiments of the present disclosure, the roller has a slot; the curling component further includes a curved clamping piece configured to fix the first end of the flexible sheet to the roller, the curved clamping piece includes a first portion and a second portion, the first portion is an arc portion and has a curvature equal to that of an outer surface of the roller, and the second portion is embedded in the slot of the roller.

Another embodiment of the present disclosure further provides a flexible screen curling apparatus including the curling device according to any one of the embodiments mentioned above, the flexible sheet includes a flexible screen.

BRIEF DESCRIPTION OF THE DRAWINGS

Hereinafter, the drawings accompanying embodiments of the present disclosure are simply introduced in order to more clearly explain technical solution(s) of the embodiments of the present disclosure. Obviously, the described drawings below are merely related to some of the embodiments of the present disclosure without constituting any limitation thereto.

DETAILED DESCRIPTION

In order to make objectives, technical details and advantages of the embodiments of the present disclosure apparent, the technical solutions of the embodiments will be described in a clearly and fully understandable way in connection with the drawings related to the embodiments of the present disclosure. Apparently, the described embodiments are just a part but not all of the embodiments of the present disclosure. Based on the described embodiments herein, those skilled in the art can obtain other embodiment(s), without any inventive work, which should be within the scope of the present disclosure.

Unless otherwise defined, all the technical and scientific terms used herein have the same meanings as commonly understood by one of ordinary skill in the art to which the present disclosure belongs. The terms "first," "second," etc., which are used in the description and the claims of the present application for disclosure, are not intended to indicate any sequence, amount or importance, but distinguish various components. Also, the terms such as "a," "an," etc., are not intended to limit the amount, but indicate the existence of at least one. The terms "comprise," "comprising," "include," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but can include an electrical connection, directly or indirectly. "On," "under," "right," "left" and the like are only used to indicate relative position relationship, and when the position of the described object is changed, the relative position relationship can be changed accordingly.

Figure 1:
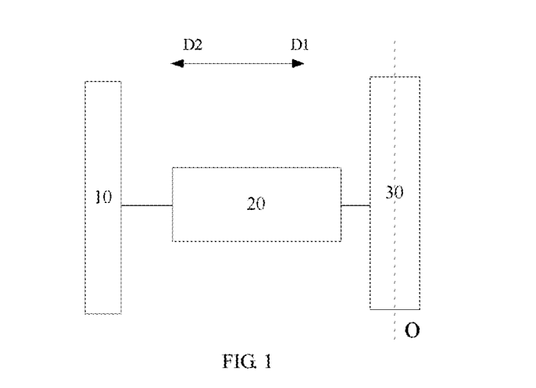
FIG. 1 is a structural block diagram illustrating a curling device provided by an embodiment of the present disclosure.

FIG. 1 is a structural block diagram illustrating a curling device provided by an embodiment of the present disclosure. As illustrated in FIG. 1, the curling device includes a curling component 30, a movable part 10 and a transmission mechanism 20. The curling component 30 is configured to fix a first end of a flexible sheet, and the movable part 10 is configured to fix a second end of the flexible sheet opposite to the first end. That is to say, in a process of operating or processing the flexible sheet by using the curling device, the first end and the second end of the flexible sheet are fixed to the curling component 30 and the movable part 10, respectively. The transmission mechanism 20 is coupled to the curling component 30 and the movable part 10, respectively; and the transmission mechanism 20 is configured to move the movable part 10 relative to the curling component 30 in a first direction, in response to receiving an external driving force, so as to drive the curling component 30 to rotate. The first direction is perpendicular to an axis direction of the curling component. For example, the axis direction is illustrated by a dashed line indicated by O in FIG. 1. In the schematic structural diagram of FIG. 1, the transmission mechanism 20 is illustrated to be connected with the curling component 30 and the movable part 10, respectively; but this does not necessarily mean that the transmission mechanism 20 is directly connected with the curling component 30 and the movable part 10, respectively. FIG. 1 is only intended to schematically illustrate that mechanical coupling exists between the transmission mechanism 20 and the curling component 30 and between the transmission mechanism 20 and the movable part 10, to realize a rotation of the curling component 30 when being driven by a movement of the movable part 10.

With the curling device, a curling effect of a flexible sheet can be conveniently achieved, and the curling device can be used for testing curling performance and service life of the flexible sheet.

The curling device provided by the embodiment of the present disclosure may cause the flexible sheet to be curled or bent; although "curled" or "bent" is mentioned herein, yet they should be understood to have a same or similar meaning, that is, to have a curved (non-flat) state, or to be changed from a flat state to the curved (non-flat) state.

In addition, the terms "coupling", "coupled", "fixing", "fixed", and the like, as mentioned herein, are meant to include either direct connection or indirect connection, and a connection mode includes detachable connection and non-detachable connection. A specific implementation mode of "coupling", "coupled", "fixing", "fixed", will not be specifically limited herein. Further, it can be understood that the flexible sheet as mentioned above is not a component of the curling device provided by the embodiment of the present disclosure, but an object to be operated or processed with the curling device. Moreover, the first direction as mentioned herein that is perpendicular to the axis direction of the curling component is not limited to a single direction, and the first direction may include two directions that are parallel with each other and are completely opposite to each other. For example, in FIG. 1, the first direction may be a direction from the movable part 10 to the curling component 30 as indicated by an arrow D1, or may also be a direction from the curling component 30 to the movable part 10 as indicated by an arrow D2. Further, the term "flexible sheet" as mentioned herein refers to any flexible sheet or plate element that can be curled or bent, which may be a finished product, or may also be a semi-finished product. There is not any limitation to the flexible sheet in the present application with respect to thickness, specific material composition and shape, etc., which may be designed according to needs.

When the flexible sheet is operated with the curling device provided by the embodiment of the present disclosure, one end of the flexible sheet may be fixed to the curling component 30, the other end of the flexible sheet may be fixed to the movable part 10, and in this way, when the curling device receives an external driving force and is thus driven, the movable part 10 will move relative to the curling component 30 in the first direction, so as to drive the curling component 30 to rotate. Thus, the flexible sheet fixed to the curling component 30 can rotate together with the curling component 30, so as to implement curling or bending of the flexible sheet. Therefore, the curling device provided by the embodiment of the present disclosure implements automatic curling or bending of the flexible sheet with a relatively simple structure. In addition, the movable part of the curling device may also reciprocate in the first direction, so that the flexible sheet is repeatedly wound and unwound, and the curling or bending performance of the flexible sheet can be tested to determine the curling life or performance of the flexible sheet. For example, the flexible sheet may be a flexible screen in a flexible display device, and the curling device provided by the embodiment of the present disclosure may be used for simulating a process in which the flexible screen is repeatedly curled, so as to test service life and reliability of the flexible screen, and provide support for commercialization of the flexible screen.

For example, the curling component refers to any component for the flexible sheet to be wound on and to be curled or bent as it rotates. In some embodiments, a curling component 30 includes a roller. The roller can rotate in different directions centered on its longitudinal axis, so that the flexible sheet is curled or returns to a flat state.

Figure 2:
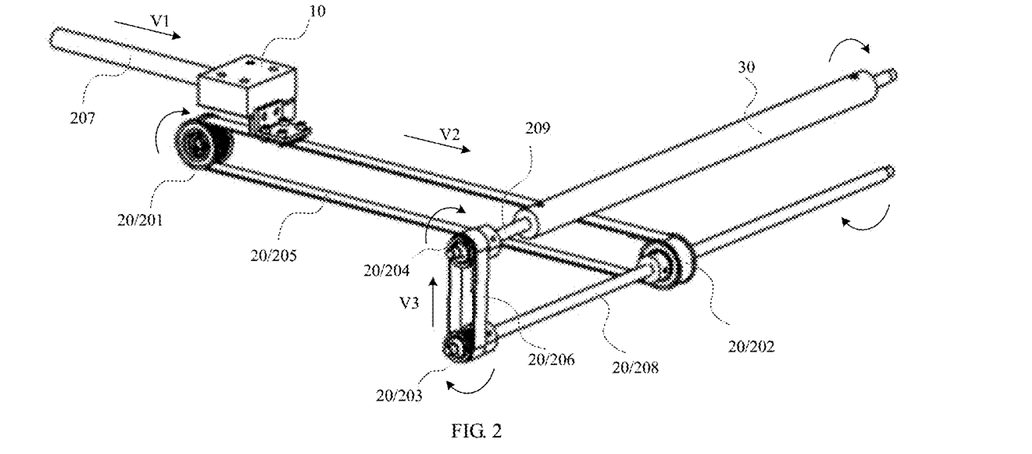
FIG. 2 is a structural view illustrating a transmission mechanism in a curling device provided by the embodiment of the present disclosure.

In some embodiments, the transmission mechanism may be a mechanical transmission structure that includes a wheel and a conveyor belt. Hereinafter, an example of the transmission mechanism 20 will be specifically explained in conjunction with FIG. 2. As illustrated in FIG. 2, the transmission mechanism 20 may include a first wheel 201, a second wheel 202, a third wheel 203 and a fourth wheel 204; the first wheel 201 and the second wheel 202 are coupled to each other through a first conveyor belt 205, the third wheel 203 and the fourth wheel 204 are coupled to each other through a second conveyor belt 206, the second wheel 202 is coaxially coupled to the third wheel 203, and the fourth wheel 204 is coaxially coupled to a roller in a curling component 30. One of the first wheel 201 and the first conveyor belt 205 is configured to receive an external driving force, and the movable part is coupled to the first conveyor belt 205. That is to say, in different embodiments, an external driving force may be supplied to a first wheel 201, or may be supplied to a first conveyor belt 205. In an example that the first wheel 201 receives the external driving force, the first wheel 201 may be coupled to an external electric device or other driving devices, such that the first wheel 201 can rotate when being driven by the electric device or other driving devices, so as to drive the first conveyor belt 205 to move, and such movement is transmitted inside the transmission mechanism 20 and is converted into rotation of the fourth wheel 204, which ultimately drives the roller in the curling component 30 to rotate. Alternatively, in another embodiment, as illustrated in FIG. 2, the first conveyor belt 205 may receive an external driving force and thus move, so as to drive the first wheel 201 and the second wheel 202 to rotate, and finally drive the roller in the curling component 30 to rotate. For example, the first conveyor belt 205 may be coupled to a link rod 207, and the link rod 207 is arranged to be parallel with the first direction, and is configured to move along the first direction under an action of the external driving force.

In the embodiment of FIG. 2, the second wheel 202 and the third wheel 203 are coupled to each other through a first shaft 208; the roller and the fourth wheel 204 are coupled to each other through a second shaft 209; the first shaft 208 and the second shaft 209 are parallel with each other; the first shaft 208 is located below the second shaft 209; and a line connecting centers of the first wheel 201 and the second wheel 202 is parallel with the first direction. The second shaft 209 may be a rotation shaft of the roller itself in the curling component. Thus, the transmission mechanism 20 composed of a small number of mechanical components automatically converts the external driving force into a driving force which makes the roller rotate, so as to implement curling or bending of the flexible sheet. When a user uses the curling device, it is only necessary to control the external driving force by simply controlling the external driving device, and the transmission mechanism brings great convenience to the user in using and operating the curling device.

Figure 3:
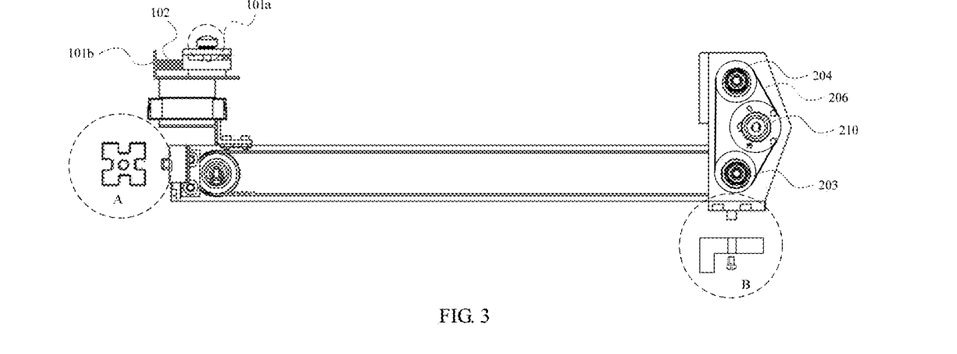
FIG. 3 is a cross-sectional view illustrating a portion of a curling device provided by an embodiment of the present disclosure.

According to another embodiment of the present disclosure, the transmission mechanism 20 further includes a fifth wheel located between the third wheel and the fourth wheel. For example, in a cross-sectional view illustrating a portion of a curling device illustrated in FIG. 3, the fifth wheel 210 is in contact with the second conveyor belt 206 through which the third wheel 203 and the fourth wheel 204 are coupled to each other, and the fifth wheel 210 is located within a region defined by the second conveyor belt 206. The fifth wheel 210 can enhance a coupling between the second conveyor belt 206 and the third wheel and a coupling between the second conveyor belt 206 and the fourth wheel, which is more favorable for an operation stability of the transmission mechanism 20. The fifth wheel 210 is located within the region enclosed by the second conveyor belt 206 and is in contact with the second conveyor belt 206, so the second conveyor belt 206 will always be in contact with an edge of the fifth wheel during cyclic movement around the third wheel and the fourth wheel, and the fifth wheel 210 can function to tense the second conveyor belt 206. For example, as operation time of the curling device increases, the second conveyor belt 206 may undergo certain deformation, so its actual length increases to a certain extent. The fifth wheel 210 can prevent the second conveyor belt 206 from having a large gap and generating relative sliding relative to the third wheel and the fourth wheel, thereby facilitating operational reliability of the transmission mechanism 20. For example, as illustrated in FIG. 3, a line connecting centers of the fifth wheel 210, the third wheel 203 and the fourth wheel 204 forms a triangle, which thus may facilitate a tensing of the second conveyor belt 206. For example, the triangle formed by the line connecting the centers of the fifth wheel 210, the third wheel 203 and the fourth wheel 204 is an obtuse triangle; and an included angle between a line connecting the centers of the fifth wheel 210 and the third wheel 203 and a line connecting the centers of the fifth wheel 210 and the fourth wheel 204 is an obtuse angle. In some embodiments, a position of a fifth wheel 210 is adjustable, so that the second conveyor belt can be tensed according to an actual slack condition of the second conveyor belt 206.

In the above-described embodiments, at least one selected from the group consisting of the first wheel 201, the second wheel 202, the third wheel 203, the fourth wheel 204 and the fifth wheel 210 may be a gear wheel, or may also be a pulley wheel, or a combination thereof. Correspondingly, in the case where the first wheel 201, the second wheel 202, the third wheel 203, the fourth wheel 204 and the fifth wheel 210 are gear wheels, the first conveyor belt 205 and the second conveyor belt 206 may be toothed belts, to realize reliable and stable coupling between the conveyor belts and the wheels. In other embodiments, a mechanical driving force may also be transmitted without a conveyor belt. For example, in the case where the third wheel 203 and the fourth wheel 204 are both gear wheels, they may be provided close to each other with their teeth mutually engaged, so that a rotation of the third gear wheel 203 directly drives a rotation of the fourth gear wheel 204, so as to drive the roller in the curling component to rotate.

According to some embodiments of the present disclosure, a radius of the fourth wheel 204 is equal to a radius of the roller in the curling component 30, and a radius of the second wheel 202 is equal to a radius of the third wheel 203. Still referring to FIG. 2, the first wheel 201 and the second wheel 202 are both coupled to the first conveyor belt 205, the second wheel 202 is coaxially coupled to the third wheel 203, the third wheel 203 and the fourth wheel 204 are both coupled to the second conveyor belt 206, and the fourth wheel 204 is coaxially coupled to the roller, so during an operation of the curling device, the first wheel 201 and the second wheel 202 have the same linear velocity V2, the second wheel 202 and the third wheel 203 have the same angular velocity, the third wheel 203 and the fourth wheel 204 have the same linear velocity V3, and the fourth wheel 204 and the roller have the same angular velocity. In this case, if the radius of the fourth wheel 204 is equal to the radius of the roller in the curling component 30, and the radius of the second wheel 202 is equal to the radius of the third wheel 203, then, a moving speed of the first conveyor belt 205 (i.e., the linear velocity V2 of the first wheel 201 and the second wheel 202) may be made equal to the linear velocity of a rotation of the roller. With respect to the embodiment of FIG. 2, a synchronization of a movement of the link rod 207 and an action of the roller that drives the flexible sheet to rotate can be achieved, so as to reduce or avoid a phenomenon of a slip or an excessive tension of the conveyor belt that occurs to the transmission mechanism 20 and the roller during operation, which facilitates a reliability and a stability of the curling device during operation, and reduces or avoids a damage to the flexible sheet. Thus, in some embodiments, the second wheel 202 and the third wheel 203 are two gear wheels completely identical to each other, and a diameter of the fourth wheel 204 is equal to a diameter of the roller.

Figure 4:
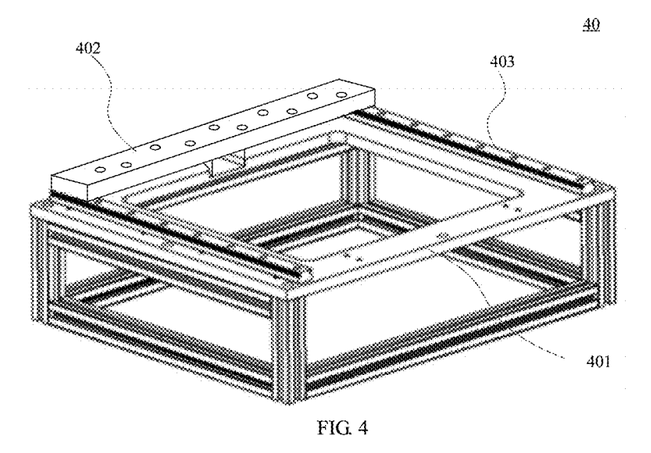
FIG. 4 is a schematic diagram illustrating a support frame in a curling device provided by an embodiment of the present disclosure.

In some embodiments, the curling component, the movable part and the transmission mechanism in the curling device may be fixed to a suitable support structure. In this case, the curling device further includes a support frame for mounting and integrating the curling component, the movable part and the transmission mechanism as described above. FIG. 4 is a schematic diagram illustrating a support frame 40 in a curling device provided by an embodiment of the present disclosure. A top surface of the support frame 40 has a first side edge 401 and a second side edge 402 opposite to the first side edge 401. The support frame 40 further has a guide rail 403. The guide rail 403 is bridged between the first side edge 401 of the top surface and the second side edge 402 of the top surface opposite to the first side edge 401. In FIG. 4, a double guide rail 403 having a symmetrical structure is illustrated; however, in other embodiment, the support frame 40 may also have only one guide rail, or include a larger number of guide rails, without limited thereto.

Figure 5:
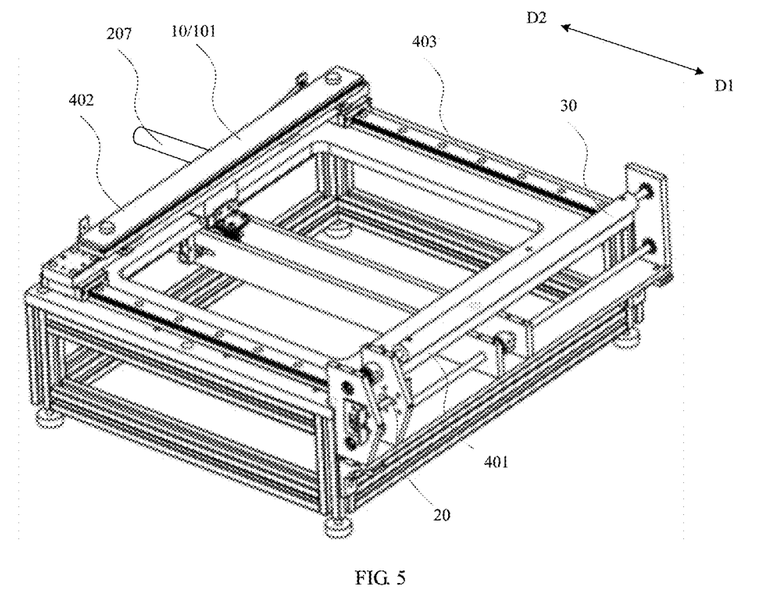
FIG. 5 is a perspective view illustrating a curling device provided by an embodiment of the present disclosure.

FIG. 5 is a perspective view illustrating a curling device provided by another embodiment of the present disclosure. In the embodiment of FIG. 5, the curling component, the movable part and the transmission mechanism have been assembled to the support frame. As illustrated in FIG. 5, the roller in the curling component 30 is coupled to the first side edge 401 of a top surface of the support frame, the guide rail 403 is bridged between the first side edge 401 and the second side edge 402 of the support frame, and the movable part 10 is configured to move in the first direction along the guide rail 403. Although a link rod 207 is illustrated in FIG. 5, the link rod 207 may be an element that is detachably coupled to the first conveyor belt 205, so the link rod 207 may also be considered to be an element independent of the curling device.

Figure 6:
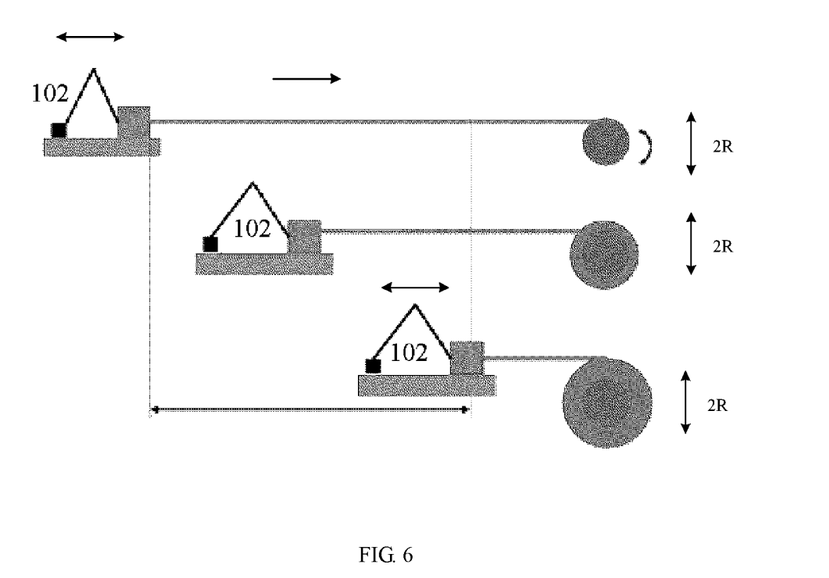
FIG. 6 is a schematic diagram illustrating different states of an elastic element in a movable part in a curling device provided by an embodiment of the present disclosure.

According to some embodiments of the present disclosure, the movable part 10 is provided with a clamping part configured to fix the second end of the flexible sheet, that is, during an operation of the curling device, the flexible sheet is coupled to the movable part 10 through the clamping part. For example, still referring to FIG. 3, it can be deemed as a cross-sectional view illustrating a portion of the curling device illustrated in FIG. 5 taken along the first direction. The movable part 10 is provided with a clamping part 101a, and the clamping part 101a may include a bolt or a screw and a pressing piece located below the bolt or the screw. When the curling device is in operation, the second end of the flexible sheet may be placed between the pressing piece and a main body of the movable part, and the second end of the flexible sheet is tightly coupled to the main body of the movable part by means of the bolt or the screw. Here, the clamping part is schematically illustrated only by means of an example, those skilled in the art may fix the second end of the flexible sheet to the movable part in many other different ways, and a specific form of the clamping part will not be limited in the present application. In some embodiments, as illustrated in FIG. 3, the movable part further includes an elastic element 102; a first end of the elastic element 102 is coupled to a clamping part 101a; and a second end of the elastic element is coupled to a main body of the movable part, and the second end of the elastic element is further away from the first side edge of the support frame than the first end of the elastic element. FIG. 6 is a schematic diagram illustrating some states of an elastic element 102 during operation of a curling device provided by an embodiment of the present disclosure. An inventor of the present application realizes that, when the curling device is in operation, the curling component drives the flexible sheet to be curled around an axis of the roller; as the flexible sheet is continuously curled on the roller, the number of layers of flexible sheet wound on a surface of the roller of the curling component also gradually increases, that is, a radius of an entire cross section of the curling component gradually increases; and as illustrated in FIG. 6, a length of the flexible sheet curled by each turn of the roller also increases constantly. Therefore, the flexible sheet may be excessively stretched and damaged. The elastic element 102 can avoid or mitigate the excessive stretching phenomenon of the flexible sheet. For example, due to elastic deformation of the elastic element, when the movable part 10 moves toward a direction close to the curling component, a distance L between the first end and the second end of the elastic element 102 will increase as an amount of the flexible sheet wound on the roller increases, and elastic extension of the elastic element can compensate for excessive curling of the flexible sheet and prevents the flexible sheet from being excessively stretched. Besides, the stretching action of the elastic element 102 can maintain the flexible sheet in a substantially flat state even if it is not supported by any support, and can avoid a sliding phenomenon of a portion of the flexible sheet that has been curled. For example, the elastic element includes, but is not limited to, a spring.

Still referring to FIG. 3 and FIG. 5, according to some embodiments of the present disclosure, a main body of the movable part 10 includes a beam 101 supported above the guide rail of the support frame, the beam 101 is arranged to be parallel with the first side edge 401 of the top surface of the support frame; the clamping part 101a may be coupled to the beam 101; a first end of an elastic element 102 is coupled to the clamping part; and a second end of the elastic element 102 is coupled to a rear wall 101b of the beam 101 that is away from the first side edge 401 of the support frame. In some embodiments, a main body of the beam 101 may be of a cuboid structure having a groove, and as illustrated in FIG. 5, a second end of the flexible sheet may be placed within the groove, that is, the groove of the beam constitutes a portion of the clamping part in this case.

Figure 7:
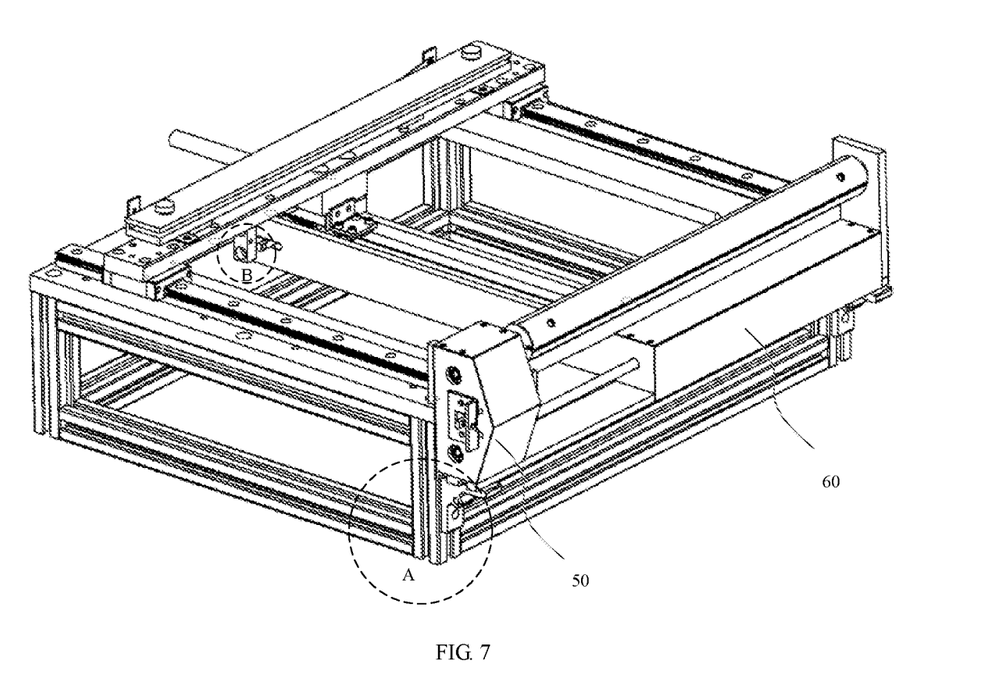
FIG. 7 is a structural perspective view illustrating a curling device provided by another embodiment of the present disclosure.

FIG. 7 is a perspective view illustrating a curling device provided by some embodiments of the present disclosure. As illustrated in FIG. 7, the curling device according to this embodiment includes a first housing 50 configured to encapsulate the third wheel, the fourth wheel and the second conveyor belt; the first housing 50 is fixed to a first side surface of the support frame that is perpendicular to the top surface; and the first side surface includes the first side edge 401. Further, in this embodiment, the curling device includes a second housing 60 configured to encapsulate the first wheel, the second wheel and the first conveyor belt; one end of the second housing 60 is coupled to a second side surface of the support frame opposite to the first side surface; and the other end of the second housing is attached to the first side surface. In this way, it is not only favorable for aesthetic appearance of the curling device, but also favorable for assembly and separation between the transmission mechanism and the support frame. As illustrated in FIG. 7, the first housing 50 may be combined with the support frame at position A; for example, at position A, the first housing 50 has a protruding portion, the support frame has a groove, and the protruding portion of the first housing 50 may be embedded in the groove of the support frame. One end of the second housing 60 may be coupled to the support frame at position B. For example, the second housing is fixed to the support frame by screws at position B. In the partial cross-sectional view illustrating FIG. 3, it is also schematically illustrated that the first housing and the second housing are coupled to the support frame at position A and position B, respectively. Moreover, a curling component 30 of the curling device may also be detachably assembled to the support frame and the first housing 50, respectively. Therefore, with respect to the curling device provided by the embodiment, the transmission mechanism, the movable part and the curling component can all be conveniently assembled with and separated from the support frame, which facilitates daily maintenance of the curling device.

Figure 8:
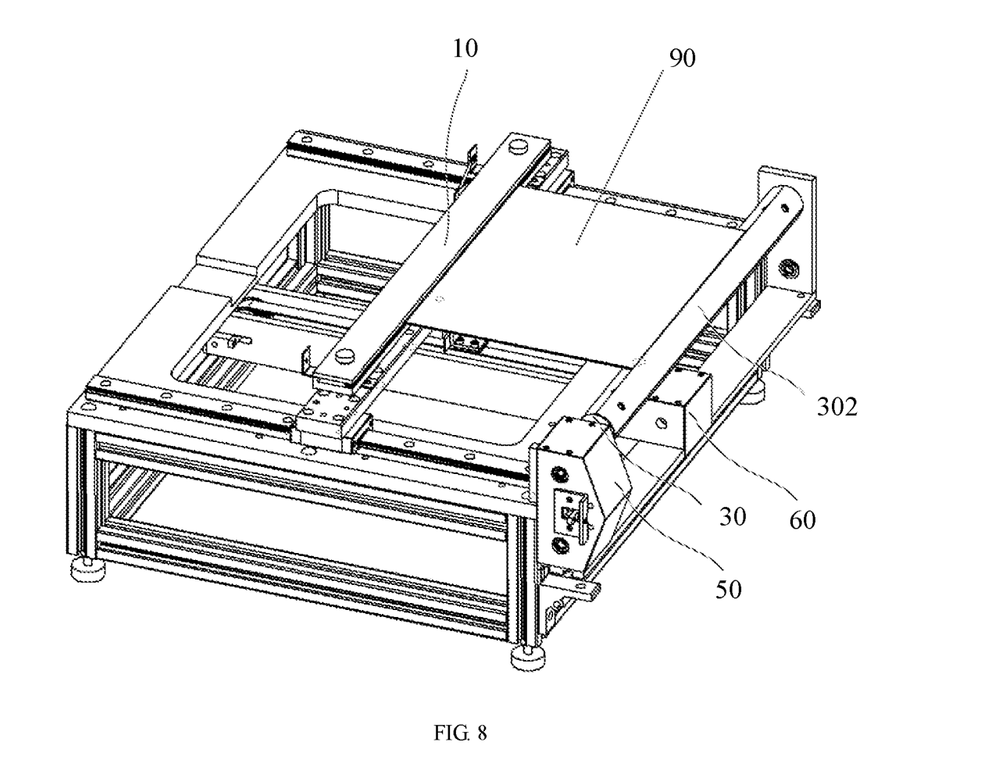
FIG. 8 is a schematic view illustrating a curling device in an operating state provided by an embodiment of the present disclosure.

FIG. 8 is a schematic view illustrating a curling device in an operating state provided by the embodiment of the present disclosure; in FIG. 8, two ends of the flexible sheet 90 are fixed to the movable part 10 and the curling component 30, respectively; and the movable part 10 is moving along the first direction toward the curling component 30.

Figure 9:
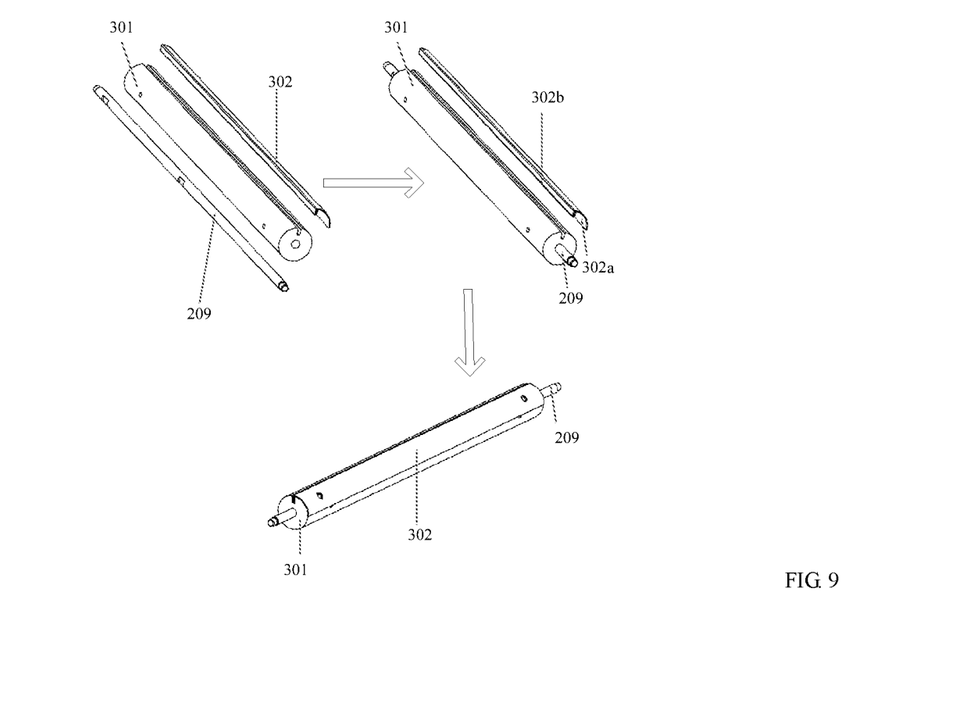
FIG. 9 is an exploded structural diagram illustrating a curling component in a curling device provided by an embodiment of the present disclosure.

FIG. 9 is an exploded structural diagram illustrating a curling component in a curling device provided by another embodiment of the present disclosure. As illustrated in FIG. 9, the curling component includes a roller 301 and a rotation shaft, the rotation shaft is arranged at a center of the roller, and here the rotation shaft may be equivalent to the second shaft 209 illustrated in FIG. 2. In this embodiment, the roller 301 has a slot; the curling component further includes a curved clamping piece 302 configured to fix the first end of the flexible sheet to the roller; the curved clamping piece 302 includes a first portion 302a and a second portion 302b; the first portion 302a is an arc portion and has a curvature equal to that of an outer surface of the roller; and the second portion 302b is embedded in the slot of the roller. The first portion 302a may be further closely affixed to the roller 301 by means of a screw. With the curling component provided by this embodiment, the curved clamping piece 302 can tightly clamp one end of the flexible sheet, so as to firmly fix the flexible sheet to the roller 301. In addition, the second portion 302b of the curved clamping piece can function as a reinforcing rib, to enhance a clamping force of the curved clamping piece that is applied to the flexible sheet. Therefore, a thickness of the curved clamping piece may be made very small while an effective clamping force applied to the flexible sheet is ensured, which thus is favorable for a flatness of the flexible sheet after curling.

Still another embodiment of the present disclosure provides a flexible screen curling apparatus, which may include the curling device according to any one of the foregoing embodiments. For example, the flexible sheet as mentioned above is just a flexible screen in a flexible display product. With the flexible screen curling apparatus, a process of repeatedly curling the flexible screen can be simulated, so as to test service life and reliability of the flexible screen, and provide support for commercialization of the flexible screen.

The above are only specific implementations of the present disclosure, without limiting the protection scope of the present disclosure thereto. Any changes or substitutions easily occur to those skilled in the art within the technical scope of the present disclosure should be covered in the protection scope of the present disclosure. Therefore, the protection scope of the present disclosure should be based on the protection scope of the claims.

What is claimed is:

1. A curling devive for curling a flexible sheet, comprising:
   a curling component configured to fix a first end of the flexible sheet;
   a movable part configured to fix a second end of the flexible sheet, the second end being opposite to the first end; and
   a transmission mechanism coupled to the curling component and the movable part, the transmission mechanism being configured to move the movable part relative to the curling component in a first direction, in response to receiving an external driving force, so as to drive the curling component to rotate, the first direction being perpendicular to an axis direction of the curling component,
   wherein the curling component comprises a roller,
   wherein the transmission mechanism comprises a first wheel, a second wheel, a third wheel, and a fourth wheel; the first wheel and the second wheel are coupled to each other through a first conveyor belt; the third wheel and the fourth wheel are coupled to each other through a second conveyor belt; the second wheel is coaxially coupled to the third wheel; the fourth wheel is coaxially coupled to the roller; one of the first wheel and the first conveyor belt is configured to receive the external driving force; and the movable part is coupled to the first conveyor belt.

2. The curling device according to claim 1, wherein the first conveyor belt is coupled to a link rod; and the link rod is arranged to be parallel with the first direction, and is configured to move along the first direction under an action of the external driving force.

3. The curling device according to claim 1, wherein the second wheel and the third wheel are coupled to each other through a first shaft, the roller and the fourth wheel are coupled to each other through a second shaft, the first shaft and the second shaft are parallel with each other, the first shaft is located below the second shaft, and a line connecting centers of the first wheel and the second wheel is parallel with the first direction.

4. The curling device according to claim 1, wherein the transmission mechanism further comprises a fifth wheel located between the third wheel and the fourth wheel, the fifth wheel is in contact with the second conveyor belt through which the third wheel and the fourth wheel are coupled to each other, and the fifth wheel is located within a region defined by the second conveyor belt.

5. The curling device according to claim 4, wherein at least one selected from the group consisting of the first wheel, the second wheel, the third wheel, the fourth wheel, and the fifth wheel comprises a gear wheel or a pulley wheel.

6. The curling device according to claim 1, wherein a radius of the fourth wheel is equal to a radius of the roller, and a radius of the second wheel is equal to a radius of the third wheel.

7. The curling device according to claim 3, wherein a line connecting centers of the third wheel, the fourth wheel, and the fifth wheel forms a triangle.

8. The curling device according to claim 7, wherein the triangle is an obtuse triangle.

9. The curling device according to claim 8, wherein an included angle between a line connecting the centers of the fifth wheel and the third wheel and a line connecting the centers of the fifth wheel and the fourth wheel is an obtuse angle.

10. The curling device according to claim [[2]] further comprising a support frame, wherein the roller is coupled to a first side edge of a top surface of the support frame, the support frame comprises a guide rail bridged between the first side edge of the top surface and a second side edge of the top surface opposite to the first side edge, and the movable part is configured to move in the first direction along the guide rail.

11. The curling device according to claim 10, wherein the movable part is provided with a clamping part configured to fix the second end of the flexible sheet, the movable part further comprises an elastic element, the elastic element has a first end coupled to the clamping part and a second end coupled to a main body of the movable part, and the second end of the elastic element is further away from the first side edge of the support frame than the first end of the elastic element.

12. The curling device according to claim 11, wherein the main body of the movable part comprises a beam supported by the guide rail and located above the guide rail, the beam is arranged to be parallel with the first side edge of the support frame, the clamping part is coupled to the beam, and the second end of the elastic element is coupled to a rear wall of the beam that is away from the first side edge of the support frame.

13. A curling device for curling a flexible sheet, comprising:
   a curling component configured to fix a first end of the flexible sheet;
   a movable part configured to fix a second end of the flexible sheet, the second end being opposite to the first end; and
   a transmission mechanism coupled to the curling component and the movable part, the transmission mechanism being configured to move the movable part relative to the curling component in a first direction, in response to receiving an external driving force, so as to drive the curling component to rotate, the first direction being perpendicular to an axis direction fo the curling component,
   wherein the curling component comprises a roller,
   the curling device further comprising a support frame, wherein the roller is coupled to a first side edge of a top surface of the support frame, the support frame comprises a guide rail bridged between the first side edge of the top surface and a second side edge of the top surface opposite to the first side edge, and the movable part is configured to move in the first direction along the guide rail,
   the curling device further comprising a first housing configured to encapsulate a third wheel, a fourth wheel, and a second conveyor belt, wherein the first housing is coupled to a first side surface of the support frame that is perpendicular to the top surface, and the first side surface comprises the first side edge.

14. The curling device according to claim 13, further comprising a second housing configured to encapsulate a first wheel, a second wheel, and a first conveyor belt, wherein the second housing has one end coupled to a second side surface of the support frame and the other end coupled to the first side surface, the second side surface is opposite to the first side surface.

15. The curling device according to claim 13, wherein the transmission mechanism comprises the third wheel and the fourth wheel, the third wheel and the fourth wheel are coupled to each other through the second conveyor belt, and the fourth wheel is coaxially coupled to the roller.

16. The curling device according to claim 15, wherein the transmission mechanism further comprises a first wheel and a second wheel, the first wheel and the second wheel are coupled to each other through a first conveyor belt, the second wheel is coaxially coupled to the third wheel, one of the first wheel and the first conveyor belt is configured to receive the external driving force, and the movable part is coupled to the first conveyor belt.

17. The curling device according to claim 16, further comprising a second housing configured to encapsulate the first wheel, the second wheel, and the first conveyor belt, wherein the second housing has one end coupled to a second side surface of the support frame and the other end coupled to the first side surface, the second side surface is opposite to the first side surface.

18. The curling device according to claim 13, wherein the transmission mechanism further comprises a fifth wheel located between the third wheel and the fourth wheel, the fifth wheel is in contact with the second conveyor belt through which the third wheel and the fourth wheel are coupled to each other, and the fifth wheel is located within a region defined by the second conveyor belt.

19. The curling device according to claim 1, wherein the roller has a slot, the curling component further comprises a curved clamping piece configured to fix the first end of the flexible sheet to the roller, the curved clamping piece comprises a first portion and a second portion, the first portion is an arc portion and has a curvature equal to that of an outer surface of the roller, and the second portion is embedded in the slot of the roller.

20. A flexible screen curling apparatus, comprising the curling device according to claim 1, wherein the flexible sheet comprises a flexible screen.

* * * * *

UNITED STATES PATENT AND TRADEMARK OFFICE
CERTIFICATE OF CORRECTION

PATENT NO. : 11,584,604 B2
APPLICATION NO. : 16/514395
DATED : February 21, 2023
INVENTOR(S) : Shuqi Liu et al.

It is certified that error appears in the above-identified patent and that said Letters Patent is hereby corrected as shown below:

In the Claims

Column 11, Claim 7, Line 58:
Delete "according to claim 3" and insert --according to claim 4--

Column 12, Claim 10, Line 1:
Delete "according to claim [[2]]" and insert --according to claim 1--

Column 12, Claim 13, Line 39:
Delete "axis direction fo the" and insert --axis direction of the--

Signed and Sealed this
Nineteenth Day of December, 2023

Katherine Kelly Vidal
*Director of the United States Patent and Trademark Office*